(12) United States Patent
Son et al.

(10) Patent No.: US 7,962,790 B2
(45) Date of Patent: Jun. 14, 2011

(54) INFERENCE-BASED HOME NETWORK ERROR HANDLING SYSTEM AND METHOD

(75) Inventors: Young Sung Son, Daejeon (KR); Tai Yeon Ku, Busan (KR); Jun Hee Park, Daejeon (KR); Kyeong Deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 414 days.

(21) Appl. No.: 11/949,737

(22) Filed: Dec. 3, 2007

(65) Prior Publication Data

US 2008/0133970 A1    Jun. 5, 2008

(30) Foreign Application Priority Data

Dec. 4, 2006  (KR) .................. 10-2006-0121316
Aug. 7, 2007  (KR) .................. 10-2007-0079123

(51) Int. Cl.
*G06F 11/00* (2006.01)
(52) U.S. Cl. ............................. 714/26; 714/27
(58) Field of Classification Search .......... 714/26, 714/27
See application file for complete search history.

(56) References Cited

U.S. PATENT DOCUMENTS

| | | | | |
|---|---|---|---|---|
| 5,539,877 A | * | 7/1996 | Winokur et al. ........... | 714/26 |
| 5,761,502 A | * | 6/1998 | Jacobs ......................... | 1/1 |
| 5,983,364 A | * | 11/1999 | Bortcosh et al. ........... | 714/25 |
| 6,263,455 B1 | * | 7/2001 | Bannister .................... | 714/25 |
| 6,707,795 B1 | * | 3/2004 | Noorhosseini et al. ..... | 370/242 |
| 6,742,141 B1 | * | 5/2004 | Miller ........................ | 714/26 |
| 7,533,305 B2 | * | 5/2009 | Behdjati et al. ............ | 714/57 |
| 2005/0283532 A1 | * | 12/2005 | Kim et al. .................. | 709/225 |
| 2008/0155327 A1 | * | 6/2008 | Black et al. ................ | 714/27 |
| 2008/0172583 A1 | * | 7/2008 | Mahajan et al. ............ | 714/57 |

FOREIGN PATENT DOCUMENTS

| | | |
|---|---|---|
| JP | 2006011718 | 1/2006 |
| KR | 2001-0045974 | 6/2001 |
| KR | 1020030075690 | 9/2003 |
| KR | 1020060067125 | 6/2006 |
| WO | WO-00/69184 | 11/2000 |

* cited by examiner

*Primary Examiner* — Bryce P Bonzo
(74) *Attorney, Agent, or Firm* — Rabin & Berdo, PC (57) ABSTRACT

Provided is an inference-based home network error handling system and method capable of recognizing an error which occurs in a home network environment including a plurality of devices and services that are connected and executed, handling the error on the basis of an inference function, and providing support information used to recognize a cause of the error and handle the error to the user for the convenience of the user. Accordingly, errors are recognized according to devices, networks, and services, types of the errors recognized by applying inference rules set in advance and error handling rules are inferred, a result of the inferring is provided to the user, and error handling operations are performed according to a selection of a user.

21 Claims, 9 Drawing Sheets

INFERENCE-BASED HOME NETWORK ERROR HANDLING SYSTEM AND METHOD

CROSS-REFERENCE TO RELATED APPLICATIONS

This application claims the priority of Korean Patent Application No. 10-2006-0121316 filed on Dec. 4, 2006, and the priority of Korean Patent Application No. 10-2007-0079123 filed on Aug. 7, 2007, in the Korean Intellectual Property Office, the disclosure of which is incorporated herein by reference.

BACKGROUND OF THE INVENTION

1. Field of the Invention

The present invention relates to an inference-based home network error handling system and method capable of recognizing an error which occurs in a home network environment, handling the error on the basis of an inference function, and providing support information used to recognize a cause of the error and handle the error to the user for the convenience of the user.

The present invention was supported by IT of MIC and IITA. [2006-S-066-01, Project Name: Development of high-reliable adaptive middleware for u-home]

2. Description of the Related Art

Recently, implementation of a home network system in which a plurality of household appliances are connected to a network at home is expanding.

The home network technology means a future home environment in which the household appliances within the home are connected through a network so that services can be provided regardless of devices, time, and places. Therefore, housework can be automated inside or outside the home wirelessly or through the Internet.

For example, in the home network system, household appliances such as a TV, a refrigerator, an air conditioner, and the like are connected to each room such as an interior room, a kitchen, a living room, the entrance, and the like so as to transceive information with each other, so that a remote control service capable of remotely operating the household appliances can be provided.

In addition, the home network system can provide an audiovisual (AV) service in which display apparatuses such as a television and a personal computer are connected to each other, so that contents can be reproduced and shown anywhere in the home.

In addition, the home network system can provide a security service in which a camera, a crime prevention sensor, a fire sensor, and the like are connected to each other, so that emergency situations that may occur in the home can be detected and managed.

In order to configure the home network, the aforementioned household appliances are connected to each other through Ethernet, IEEE1394, a wireless network, power line communications, and the like according to characteristics and use of the household appliances. In this case, a home server for communicating with the household appliances through the networks and controlling each of the appliances has to be included.

In the aforementioned home network system, conventional error handling is performed by setting a static solution according to an error type and managing the solution. However, there is a problem in that when an operating system is changed, the solution has to be re-constructed or reset.

Moreover, as described above, in the home network environment, various types of devices and services are complicatedly connected to each other and executed. Therefore, when a specific error occurs, an ordinary user cannot handle the error in consideration of the connection relationships between the devices and the services.

Therefore, for the convenience of the user, a method of easily handling an error which occurs in the home network system and easily reconfiguring the system changed after handling the error is required.

SUMMARY OF THE INVENTION

The present invention provides an inference-based home network error handling system and method capable of recognizing an error which occurs in a home network environment including a plurality of devices and services that are connected and executed, handling the error on the basis of an inference function, and providing support information used to recognize a cause of the error and handle the error to the user for the convenience of the user.

According to an aspect of the present invention, there is provided an inference-based home network error handling system including: a service error recognition module recognizing errors which occur in services of a home network system and collecting information on the errors; a home network error recognition module recognizing errors which occur in networks of the home network system and collecting information on the errors; a device error recognition module recognizing errors which occur in devices of the home network system and collecting information on the errors; and an error handling management module inferring an error type and an error handling rule for solving the error on the basis of the information on the errors received from the service error recognition module, the home network recognition module, and the device error recognition module, guiding a result of the inferring for a user, and executing an error handling rule selected by the user.

According to another aspect of the present invention, there is provided an inference-based home network error handling method including: setting inference rules for describing an inference range and standard for inferring an error type and a handling rule on the basis of error recognition information; recognizing an error which occurs in a home network system; inferring a type of the occurred error and an error handing rule for solving the error by applying the set inference rule; and providing a result of the inferring to the user according to device errors, network errors, and service errors and performing error handling according to a selection of the user.

Accordingly, the home network environment is managed according to devices, networks, and services, an error type is inferred on the basis of errors that occur therein and a solution of the error is proposed to the user, and the error is handled according to a selection of the user, so that the user can easily handle the error.

More specifically, types of errors are classified according to an error recognition method about a device error, a network error, and a system error, an error handling rule that is most proper is inferred from error handling rules stored to solve the errors and this is informed to the user on the screen, and error handling is performed according to a selection of a user. Therefore, when the error handling rules are dynamically set, extensibility for supporting various error handling rules can be provided.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. In the description, the detailed descriptions of well-known functions and structures may be omitted so as not to hinder the understanding of the present invention.

Like reference numerals designate like elements throughout the specification

In addition, in the specification, it should be noted that when a portion "is connected to" the other portion, the portion can be directly connected thereto or indirectly connected thereto with intervening elements present. In addition, it should be noted that a phrase that a portion "includes" an element means that the other element is not excluded but it can be further included therein if a particularly contrary phase is not disclosed.

In addition, it should be noted that a term "module" disclosed in the specification denote a unit for performing at least one function or operation, and it can be implemented in combination of hardware, software, or hardware and software.

Figure 1:
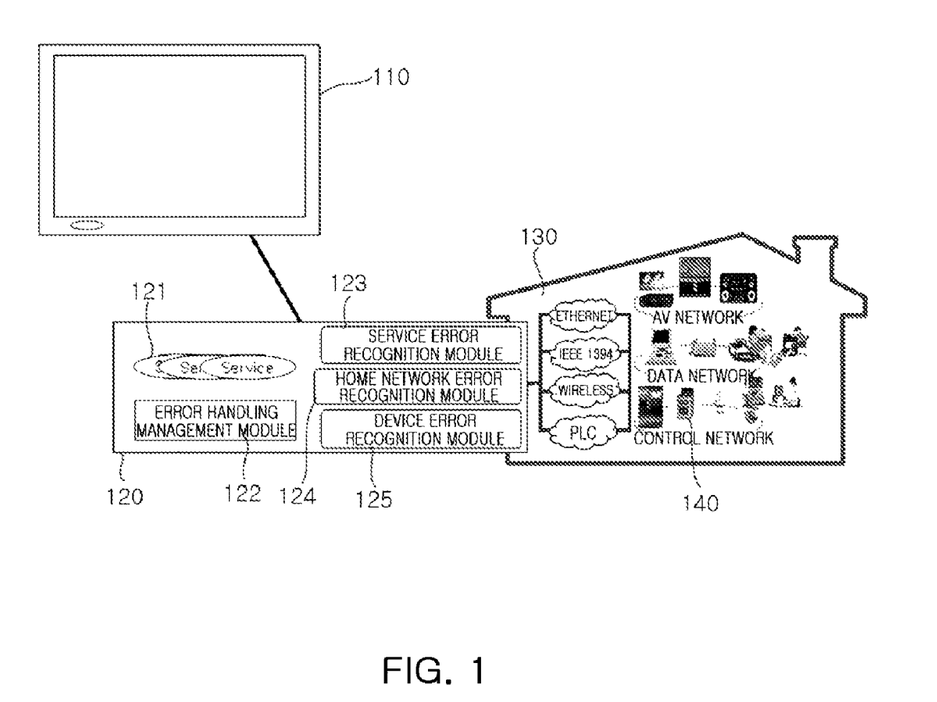
FIG. 1 is a view illustrating the entire structure of a home network system applied to the present invention.

FIG. 1 is a schematic block diagram illustrating the entire structure of a home network system applied to the present invention.

Referring to FIG. 1, the home network system includes a plurality of devices 140 which perform functions set according to its use, heterogeneous networks 130 for connecting a plurality of the devices 140 according to a communication protocol to transmit control signals or data signals thereto, a home server 120 for controlling a plurality of the devices 140 through the networks 130, and a display apparatus 110 for providing processing results or progresses of the home server 120 to a user. The home server 120 includes an application 121 for providing a plurality of services to provide a corresponding service.

In the aforementioned structure, the home network error handling system according to the present invention is implemented in the home server 120. The home network error handling system includes an error handling management module 122 for inferring a proper error handling rule through an interference technique and providing the handling rule to the user when an error occurs in the home network system, a service error recognition module 123, a home network error recognition module 124, and a device error recognition module 125, for collecting information on the errors occurring in the home network system from each of the services, networks, and devices and providing the information on the errors to the error handling management module 122.

The service error recognition module 123 recognizes errors of a service from service status information, whether or not the service is operated, the amount of service execution resources used that are extracted by monitoring each service and informs the error handling management module 122 of the recognized errors.

The home network error recognition module 124 recognizes errors of a home network from home network status information, network topology information, and network usage extracted by monitoring each network and informs the error handling management module 122 of the recognized errors.

The device error recognition module 125 recognizes errors of a device from a data type and a data value extracted from status information provide from each device and informs the error handling management module 122 of the recognized errors.

The error handling management module 122 analyzes and infers error information input from the service error recognition module 123, the home network error recognition module 124, and the device error recognition module 125 and proposes an error type and a handling rule according to the error type and also proposes reconfiguration information about services and devices needed after the error handling so as to enable the user to simply handle the error. More specifically, when a device error occurs, the error handling management module 122 retrieves services used by the device and provides a service list to the user so as to enable the user to stop the service. In addition, when a home network error occurs, the error handling management module 122 informs the user of an inferred error type and an error handling rule for handling the error so that the error can be handled according to a selection of the user or a management rule. In addition, when a service has to be reconfigured in order to continuously execute the service associated with the error type, this is informed to the user and the reconfiguration is executed according to a selection of the user. In addition, when the service is reconfigured, a list of devices and data used by the service are provided to the user so as to enable the user to execute the service continuously. In this case, the devices and data to be used can be displayed again so as to be continuously executed.

The display apparatus 110 displays information provided from the error handling management module 122 to the user.

In the error handling system having the aforementioned construction according to the present invention, the errors are managed according to devices, networks, and services. Relationships between the devices, networks, and services can be represented as illustrated in FIG. 2.

Figure 2:
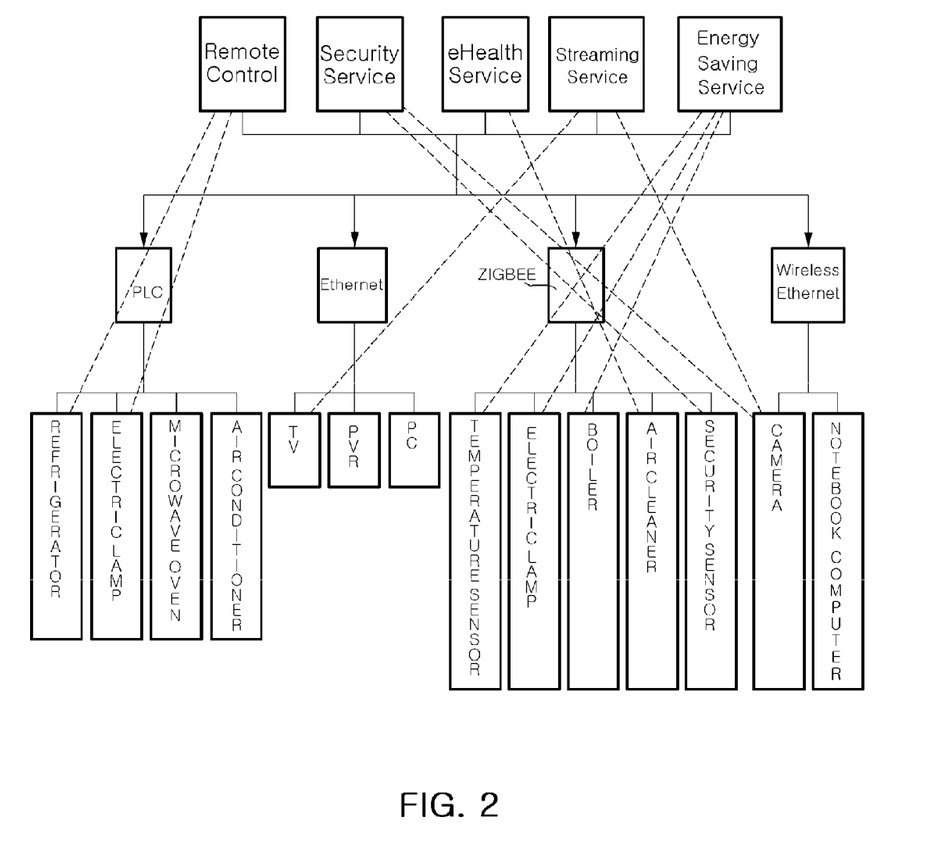
FIG. 2 is a view illustrating relationships between services, home networks, and devices in a home network system.

Referring to FIG. 2, in the home network system according to the embodiment, the devices includes household appliances such as a refrigerator, an electric lamp, a microwave oven, an air conditioner, an air cleaner, and the like, image or information processing apparatuses such as a camera, a television, a personal video recorder (PVR), a personal computer (PC), a notebook computer, and the like, and sensing means such as a temperature sensor and a security sensor. The networks include power line communications (PLC), Ethernet, Zigbee, and wireless Ethernet. The services include a remote control service provided to enable the user to control operations of the devices anywhere, a security service for detecting a break-in or a fire for safety of the user, an ehealth service provided to enable the user to keep healthy, a streaming service for reproducing contents such as moving pictures, and an energy saving service for preventing waste of energy.

The relationships between the devices and the networks are described. The refrigerator, the electric lamp, the microwave oven, and the air conditioner are connected to the PLC to be remotely controlled, the devices requiring a high transmission rate to transceive moving picture contents or data such as the TV, the PVR, the PC are connected to the Ethernet, the devices which can communicate at a low transmission rate such as the temperature sensor, the electric lamp, a boiler, the air cleaner, and the security sensor are connected to the Zigbee network, and the devices which need mobility such as the camera and the notebook computer are connected to the wireless Ethernet.

In addition, the services are indirectly connected to the associated devices through the networks. Here, one or more devices can be associated with each of the services, and one or more services can be associated with each of the devices.

In FIG. 2, the relationships between the services and the devices are represented as dotted lines. For example, the energy saving service is associated with the devices such as the temperature sensor, the electric lamp, the boiler, and the like, and the camera is associated with both the security service and the streaming service.

In this structure, the home network error handling system according to the present invention manages the errors of the home network according to the devices, the networks, and the services. To do this, the service error recognition module 123 recognizes and handles errors of various services directly used by the user, the home network error recognition module 124 recognizes and handles errors of each of the networks connecting the devices, and the device error recognition module 125 recognizes and handles errors of the home network devices according to types and functions of the devices.

Information on the errors handled by the service error recognition module 123, the home network error recognition module 124, and the device error recognition module 125 is input to the error handling management module 122 to be used to infer an error handling rule.

Figure 3:
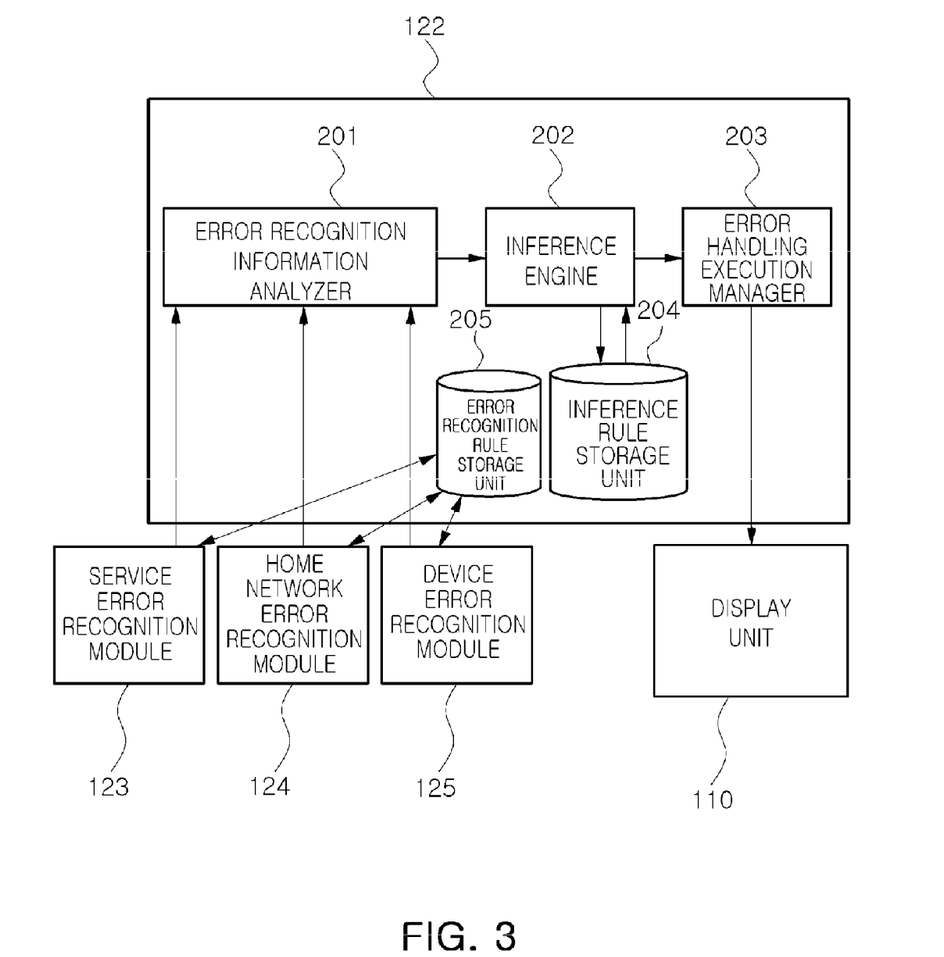
FIG. 3 is a detailed block diagram illustrating an error handling management module in a home network error handling system according to the present invention.

FIG. 3 is a detailed block diagram illustrating the error handling management module 122 in the aforementioned error handling system.

Referring to FIG. 3, the error handling management module 122 includes an error recognition information analyzer 201, an inference engine 202, an error handling execution manager 203, an inference rule storage unit 204, and an error recognition rule storage unit 205.

The error recognition information analyzer 201 analyzes error recognition information output from the error recognition modules 123 to 125 to obtain types of the errors and degrees of the errors and provides the obtained information to the inference engine 202.

The inference engine 202 infers a precise error type on the basis of inference rules stored in the inference rule storage unit 204 and infers a proper error handling rule for solving the errors.

The error handling execution manager 203 provides error information, an error handling rule according to the error information, and service reconfiguration information on the basis of a result of the inferring of the inference engine 202, and performs error handling and service reconfiguring according to a selection input by the user on the basis of the provided information.

The error recognition rule storage unit 205 stores error recognition rules used for error recognition of the service error recognition module 123, the home network error recognition module 124, and the device error recognition module 125.

In other words, the service error recognition module 123, the home network error recognition module 124, and the device error recognition module 125 receive the rules stored in the error recognition rule storage unit 205, and recognize error information on the basis of the received rules.

The inference rule storage unit 204 stores inference rules to be used by the inference engine 202 to infer the error type and the error handling rule.

Therefore, according to the present invention, the error recognition rules stored in the error recognition storage unit 205 and the inference rules stored in the inference rule storage unit 204 can be changed, so that an error recognition rage and an error inference range can be dynamically expanded.

In this structure, the error recognition information output from the error recognition modules 123 to 125 is input to the error recognition information analyzer 201 to be analyzed, and the types of the errors and the degrees of the errors are transmitted to the inference engine 202. The inference engine 202 then analyzes the types and degrees of the errors on the basis of the inference rules stored in the inference rule storage unit 204 and infers an error type having a high possibility and handling rules for handling a corresponding error to transmit the inferred information to the error handling execution manager 203.

The error handling execution manager 203 provides error information based on the inference results transmitted from the inference engine 202 (that is, the error type, the error handling rule, and the like) to the user, provides a series of operations for handling the error to the user through the display apparatus 110, and performs error handling according to a selection of the user in each of the operations.

FIGS. 4 to 8 are views illustrating user interface screens of the display apparatus 110 provided to the user in the error handling system according to the present invention. Operations of the error handling system are described with reference to FIGS. 4 to 8.

Figure 4:
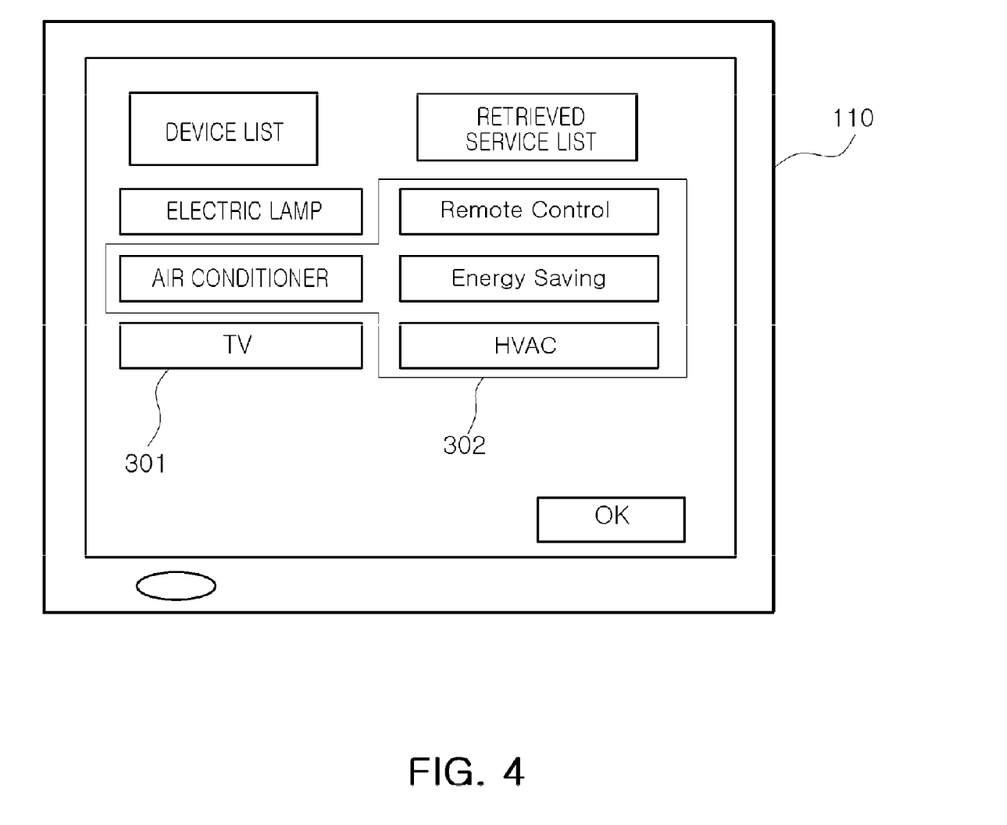
FIG. 4 is a view illustrating a user interface screen providing a list of devices and a list of services associated with each device of a home network provided in a home network error handling system according to the present invention.

The error handling system according to the present invention provides a list of devices included in the home network system and a list of services associated with each of the devices on the basis of the relationships between the services and devices illustrated in FIG. 2. FIG. 4 illustrates a user interface screen.

Referring to FIG. 4, the error handling system according to the present invention displays a list 301 of devices connected to the home network on the display apparatus 110 and when the user selects one from the list 301 of the devices, displays a list 302 of services associated with the selected device. Accordingly, the user can easily know the relationships between the devices connected to the home network and the services connected to each of the devices.

Figure 5:
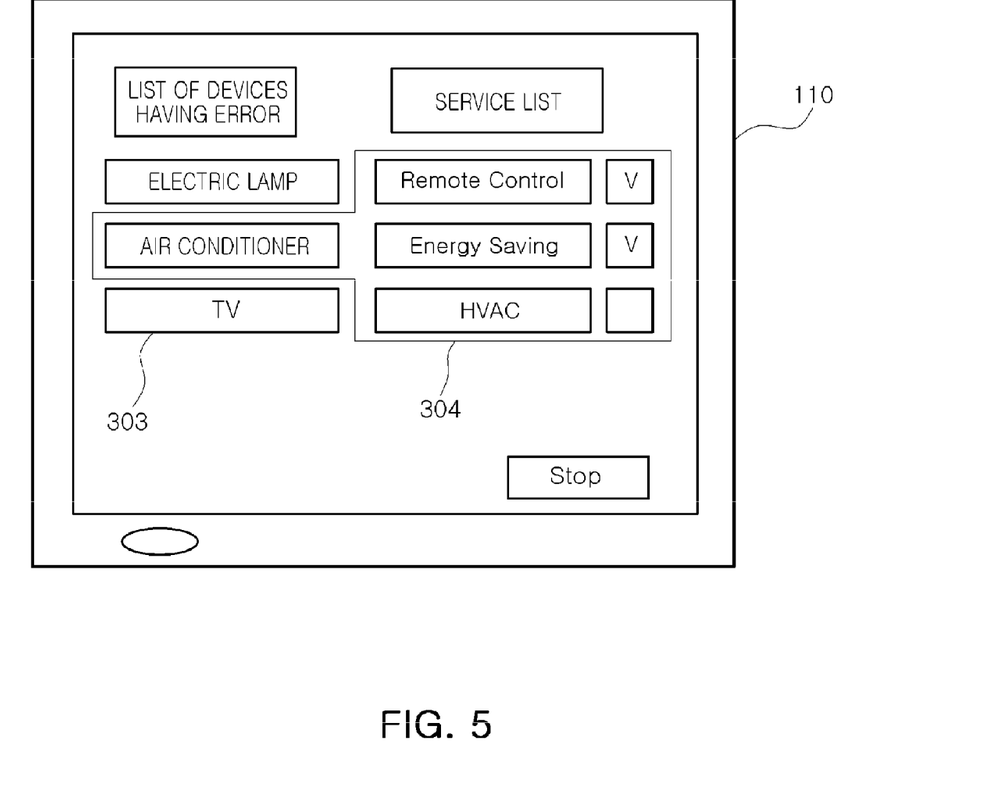
FIG. 5 is a view illustrating a user interface screen for managing service execution according to a selection of a user when a device error occurs in a home network error handling system according to the present invention.

In addition, in the error handling system according to the present invention, when an error is detected in the home network, error information is provided to the user on the display apparatus 110. FIG. 5 is a view illustrating a user interface screen provided in this operation. Referring to FIG. 5, in the error handling system according to the present invention, when the error is detected, a list 303 of devices having the error is displayed. When the user selects one device from the displayed list 303 of the devices, a list 304 of service associated with the selected device is displayed. In this case, each of the services displayed in the service list 304 is displayed so that the user can stop an operation of a corresponding service. Specifically, when an error occurs in the home network, the user is provided with the list of the devices having the error displayed on the user interface screen as illustrated in FIG. 5 and a list of services associated with each device. Thereafter, the user can selectively stop an operation of a corresponding service to handle the error.

Figure 6:
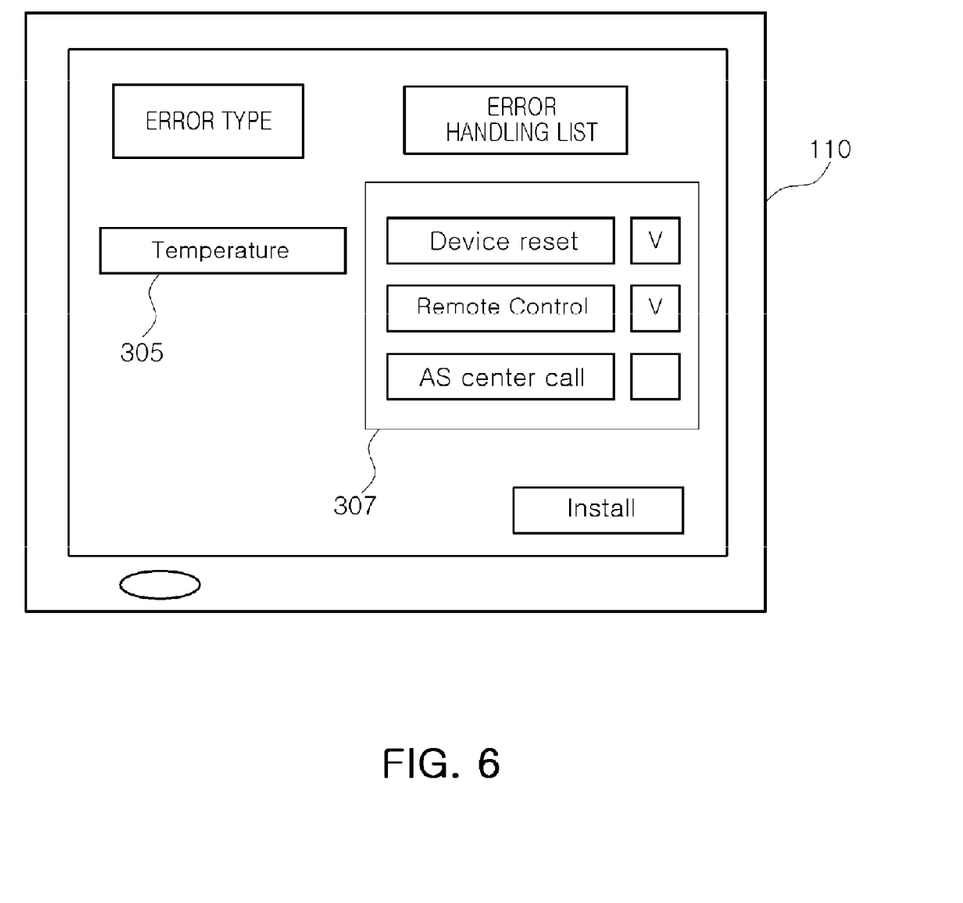
FIG. 6 is a view illustrating a user interface screen for providing a type of an occurred error and a solution in a home network error handling system according to the present invention.

After the service which is associated with the device having the error and cannot be normally performed is temporarily stopped, the error is handled. FIG. 6 is a view illustrating a user interface screen in this operation.

FIG. 6 illustrates the user interface screen for providing a type of the error inferred by the inference engine 202 and a method of handling the error in the error handing system according to the present invention.

Referring to FIG. 6, the error handling system according to the present invention displays the error type 305 representing the type of the error inferred by the inference engine 202 on the user interface screen and displays a list 306 of error handling rules inferred to handle the corresponding error. The list 306 of the error handling rules is displayed on the user interface screen so that the user can select and execute a desired handling rule.

In FIG. 6, an error associated with temperature occurs, and as handling rules for the error, device reset, remote back-up, AS center call, and the like are proposed. The user may select and executes a needed method from the methods displayed on the user interface screen.

After the error handling, due to the relationships between the devices, the networks, and the services, a case where an associated service has to be reconfigured occurs.

Figure 7:
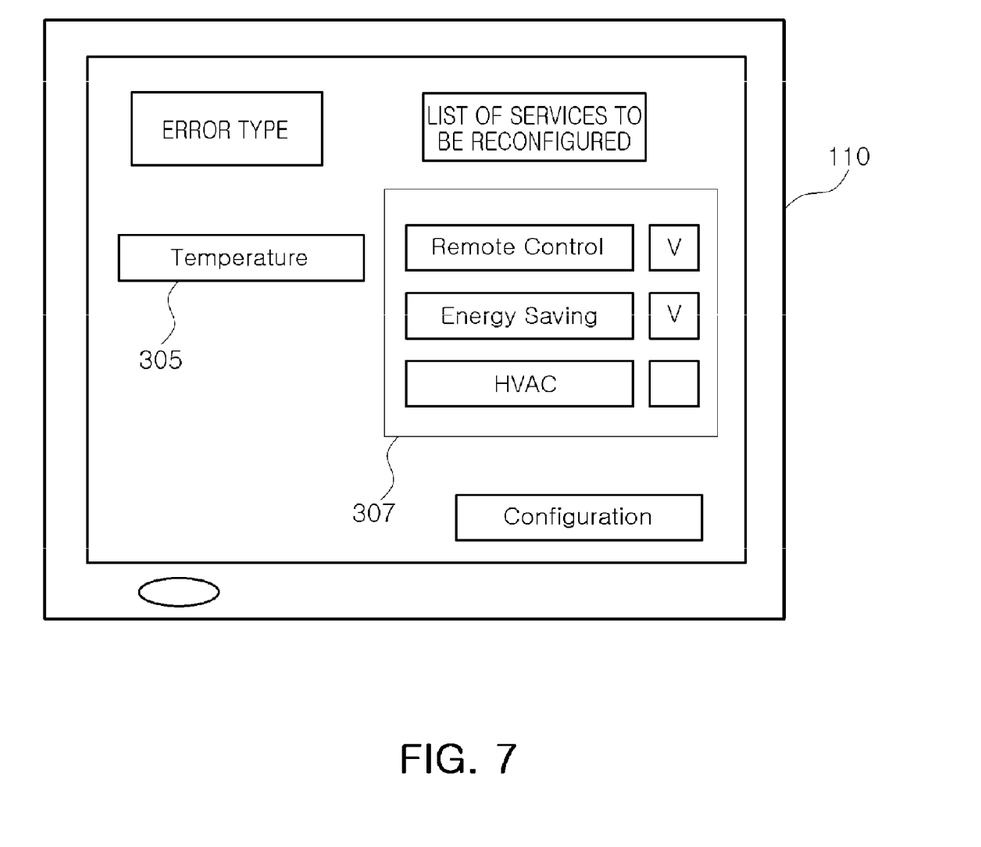
FIG. 7 is a view illustrating a user interface screen for providing a type of an occurred error and a list of services to be reconfigured in a home network error handling system according to the present invention.

In the error handling system according to the present invention, when reconfiguring the service is required after the error handling, this is displayed on the user interface screen as illustrated in FIG. 7 so that the user can handle the service reconfiguration.

Referring to FIG. 7, the error handling system according to the present invention proposes a list 307 of services that are to be reconfigured according to an error type 305 inferred by the inference engine 202. Here, services to be reconfigured may be selected from the services displayed in the service list 307.

Figure 8:
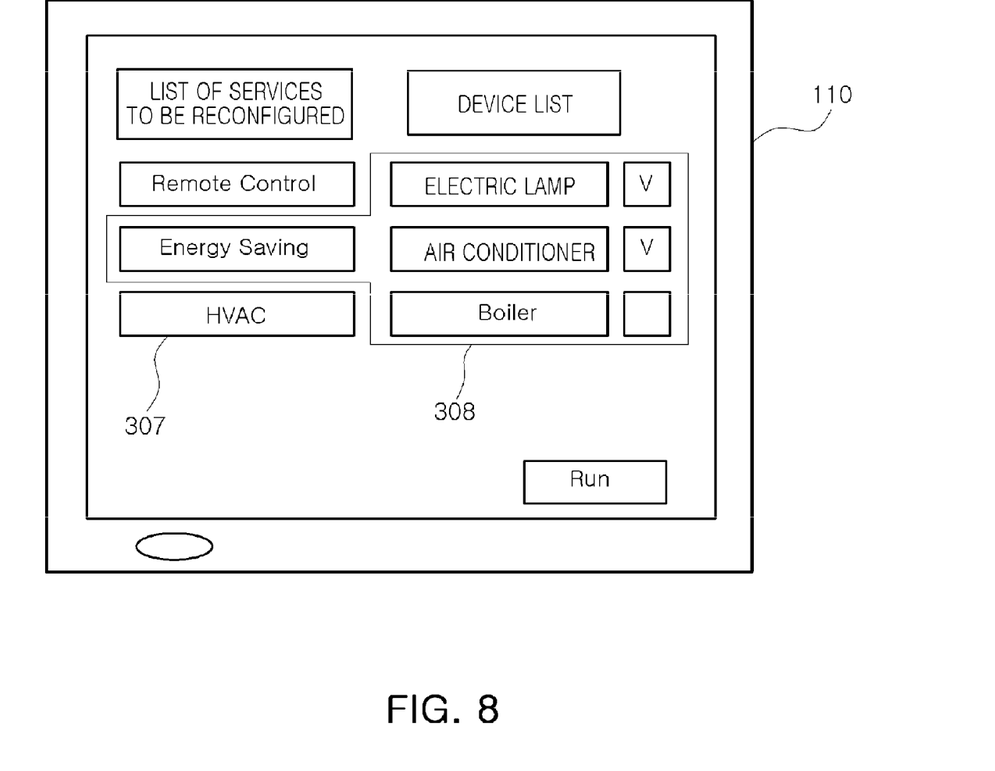
FIG. 8 is a view illustrating a user interface screen for providing a list of devices to be re-set according to services to be reconfigured in a home network error handling system according to the present invention.

As described above, when the service reconfiguration is performed, devices associated with the reconfigured service have to be reset. FIG. 8 illustrates a user interface screen for guiding and handling the reconfiguration in this operation.

Referring to FIG. 8, the error handling system according to the present invention displays a list 308 of devices associated with the services 307 to be reconfigured and selects a desired device, so that devices and data used by the service can be reconfigured according to a selection of the user. For example, as illustrated in FIG. 8, the user applies the electric lamp and the air conditioner to the energy saving service and does not apply the boiler thereto.

Figure 9:
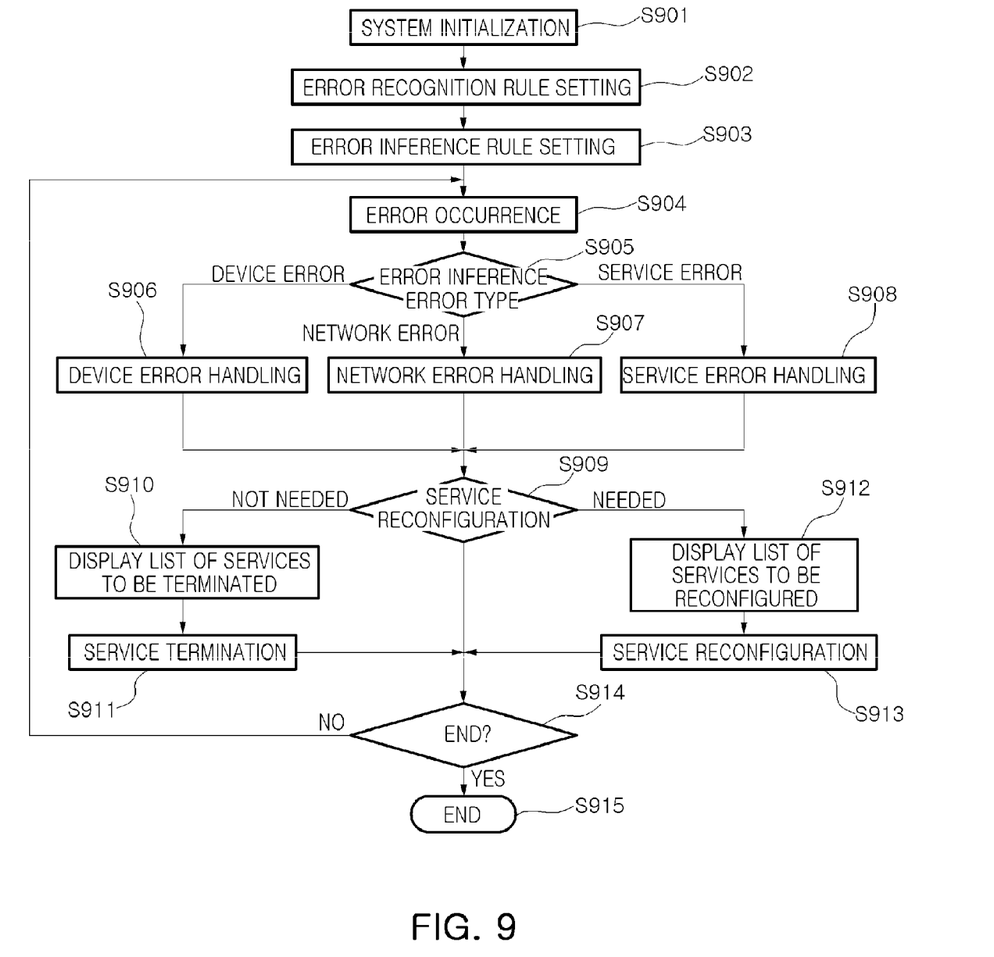
FIG. 9 is a flowchart of an inference-based error handling method in a home network error handling system according to the present invention.

The error handling operations performed based on the error handling system described above can be easily understood with reference to a flowchart in FIG. 9.

FIG. 9 is the flowchart of the operations performed by the error handling system according to the present invention.

Referring to FIG. 9, the operations of the error handling system according to the present invention are sequentially described as follows.

In the error handling system according to the present invention, when system initialization is completed (operation S901), an error recognition rule for describing an error recognition range and an error recognition standard and an inference rule for describing an inference range and standard for inferring an error type and a handing rule on the basis of the error recognition information are set (operations S902 and S903). The set error recognition rule is stored in the error recognition rule storage unit 205, and the set error inference rule is stored in the inference rule storage unit 204. In addition, status information and data of the home network is collected by the error recognition modules 123 to 125 according to the set error recognition rule to perform error recognition.

Therefore, when an error occurs in a corresponding home network system (operation S904), the error recognition modules 123 to 125 collect information on the error and transmit the collected information to the error recognition information analyzer 201. The error recognition information analyzer 201 processes the received error information and transmits the processed information to the inference engine 202. Thereafter, the inference engine 202 substitutes an error inference rule in the inference rule storage unit 204 for the occurred error to infer a matched error type and an error handling method for solving the error.

Thereafter, it is determined whether the error is a device error, a network error, or a service error by the inferring operation (operation S905). Next, an error handling rule is inferred according to the error type, the inferred error handling rule is provided to the user on the user interface screen as illustrated in FIG. 6, and the corresponding error handling rule is executed according to a selection of the user through the user interface screen (operations S906 to S908).

When handling the occurred error is completed, whether or not a service that is currently performed is to be reconfigured is checked (operation S909). When the service is to be reconfigured, a list of services to be reconfigured according to the error type is displayed on the user interface screen as illustrated in FIG. 7 for the user so that the user can select a service to be reconfigured, and a list of devices associated with the service to be reconfigured is displayed on the user interface screen as illustrated in FIG. 8, so that the service can be reconfigured according to a selection of the user input through the user interface screen (operations S912 and S913).

On the other hand, when it is determined in operation S909 that service reconfiguration is not needed, a list of services to be terminated in connection with the error handling is displayed on the user interface screen, and a corresponding service is terminated (operations S910 and S911).

Until operations of a corresponding error handling system are terminated, that is, until power of the home server 120 is turned off, operations S904 to S913 are repeatedly performed to handle an error which occurs while the home network system is operated.

Accordingly, when an error occurs in the home network system including a plurality of devices and services which are connected to each other and executed, it is determined whether the error is a device error, a home network error, or a service error. Thereafter, in order to set an error handling rule, various rules are applied through inference to obtain most appropriate results. In addition, the inferred results are properly provided to the user according to the error handling operations so that the user can easily and conveniently handle the error.

In addition, the error recognition rule for recognizing the device error, the home network error, the service error and the inference rule for inferring the error type and the error handling rule are dynamically set, so that the system can be applied to a field of home network maintenance.

While the present invention has been shown and described in connection with the exemplary embodiments, it will be apparent to those skilled in the art that modifications and variations can be made without departing from the spirit and scope of the invention as defined by the appended claims.

What is claimed is:

1. An inference-based home network error handling system for handling an error in a home network system that includes a device, a network and a service, comprising:
    three error recognition modules, including:
        a service error recognition module recognizing a first irregularity that has occurred in services of the home network system, and collecting information on the first irregularity;
        a home network error recognition module recognizing a second irregularity that has occurred in networks of the home network system, and collecting information on the second irregularity; and
        a device error recognition module recognizing a third irregularity that has occurred in devices of the home network system, and collecting information on the third irregularity; and
    an error handling management module inferring an error type, using the collected information, that indicates whether a recognized one of the first, second and third irregularities is an error in the device, an error in the network or an error in the service, and inferring error handling rules for correcting the inferred error type, guiding a result of the inferring for a user, and executing one of the error handling rules selected by the user.

2. The system of claim 1, wherein the error handling management module comprises:
    an inference rule storage unit storing inference rules which are used to infer the error type and the error handling rules;
    an error recognition information analyzer analyzing the collected information from the error recognition modules and extracting from the collected information needed for error inference;
    an inference engine inferring the error type and the error handling rules for correcting the error from the information extracted by the error recognition information analyzer on the basis of the inference rules stored in the inference rule storage unit; and
    an error handling execution manager guiding error occurrence information and error handling operations to the user, and performing error handing according to the error handling rule selected by the user.

3. The system of claim 2, wherein the error handling management module further comprises an error recognition rule storage unit storing error recognition rules for error recognition by the service error recognition module, the home network error recognition module, and the device error recognition module.

4. The system of claim 2, wherein the service error recognition module recognizes the first irregularity from service status information, whether or not the service is performed, and the usage of service execution resources extracted by monitoring the service.

5. The system of claim 2, wherein the home network error recognition module recognizes the second irregularity from home network status information, network topology information, and network usage extracted by monitoring the network.

6. The system of claim 2, wherein the device error recognition module recognizes the third irregularity from a data type and a data value extracted from status information provided from the device.

7. The system of claim 2, wherein
    the home network system includes a plurality of services, and
    when the recognized irregularity is caused by an error of the device, the error handling management module retrieves services used by the device from the plurality of services, provides a list of the services to the user, and stops one of the services on the list selected by the user.

8. The system of claim 2, wherein, when the recognized irregularity is caused by an error of the network, the error handling management module handles the error according to the user's selection or a management rule.

9. The system of claim 2, wherein,
    the home network system includes a plurality of services, and
    when one of the services is to be reconfigured in order to continuously execute one of the services associated with the error type, the error handling management module informs the user and performs the service reconfiguration according to a selection of the user.

10. The system of claim 9, wherein,
    the home network system includes a plurality of devices, and
    when the service reconfiguration is performed, the error handling management module provides to the user a list of the devices and data used by the service and performs the reconfiguration according to the user's selection.

11. An inference-based home network error handling method for handling an error in a home network system that includes a device, a network and a service, comprising:
    setting inference rules describing an inference range and standard for inferring an error type and a handling rule on the basis of information of an irregularity of the home network system;
    recognizing the irregularity;
    inferring the error type that indicates whether the recognized irregularity is an error of the device, an error of the network, or an error of the service, and inferring an error handing rule for correcting the inferred error type by applying the set inference rules; and
    providing a result of the inferring to a user and performing error handling according to a selection by the user.

12. The method of claim 11, further comprising, before recognizing the irregularity, setting an error recognition rule describing an error recognition range and an error recognition standard for recognizing the irregularity-in the home network system, before the recognizing.

13. The method of claim 12, further comprising, when the home network system includes a plurality of services, and after performing the error handling,
    checking whether or not one of the plurality of services is to be reconfigured, and
    when, based on said checking, a service reconfiguration is needed, providing service reconfiguration information to the user, and performing the service reconfiguration according a selection of the user.

14. The method of claim 13, further comprising, when the service reconfiguration is not needed after the checking, providing a list of the plurality of services to be terminated in connection with the error handling to the user, and terminating a corresponding service.

15. The method of claim 13, wherein, the home network system includes a plurality of devices, and performing the service reconfiguration further comprises providing a list of the plurality of devices and data used by the service and performing reconfiguration according to a selection of the user in order to perform the service reconfiguration.

16. The method of claim 11, wherein recognizing the irregularity comprises recognizing the irregularity from service status information, whether or not the service is performed, and the amount of service execution resources used extracted by monitoring the service.

17. The method of claim 11, wherein recognizing the irregularity comprises recognizing the irregularity from home network status information, network topology information, and network usage extracted by monitoring the network.

18. The method of claim 11, wherein recognizing the irregularity comprises recognizing the irregularity from a data type and a data value extracted from status information provided from the device.

19. The method of claim 17, wherein, when an irregularity occurs, performing the error handling comprises handling the error according to the selection of the user or a management rule.

20. The method of claim 18, wherein the home network system includes a plurality of services, and when an irregularity occurs, performing the error handling comprises retrieving services used by the device from the plurality of services, providing a list of the retrieved services to the user, and terminating one of the retrieved services selected by the user.

21. The method of claim 20, wherein performing the error handling, when one of the plurality of services is to be reconfigured in order to continuously execute the service associated with the error type, includes informing the user and performing the service reconfiguration according to the selection of the user.

* * * * *